Patented Oct. 10, 1933

1,929,654

UNITED STATES PATENT OFFICE 1,929,654

MERCERIZING LIQUOR

Hermann Schuette, Mannheim, Germany, assignor to I. G. Farbenindustrie Aktiengesellschaft, Frankfort-on-the-Main, Germany No Drawing. Application May 2, 1931, Serial No. 534,695, and in Germany May 6, 1930

6 Claims. (Cl. 8—20)

The present invention relates to improved mercerizing liquors.

I have found that textiles from cotton, such as yarns or fabrics, are mercerized in an advantageous manner when mercerizing liquors are employed which contain one or more acid sulphuric esters of aliphatic monohydric alcohols having from 4 to 8 carbon atoms in their molecule or their water-soluble salts, especially alkali metal salts. The sulphuric esters of low molecular aliphatic alcohols have the property of reducing the surface tension of strongly alkaline solutions considerably and in a higher degree than sulphuric esters containing more than eight carbon atoms. This action is surprising since the said sulphuric esters of low molecular alcohols only moderately reduce the surface tension in neutral, acid or weakly alkaline aqueous solutions. The said sulphuric esters are usually employed in quantities of from 1 to 20 grams per litre of mercerizing liquor. Mercerizing liquors prepared with the addition of from 3 to 10 grams of these sulphuric esters per litre of mercerizing liquor wet the material to be treated most rapidly and have an excellent mercerizing effect.

The acid sulphuric esters of n- or iso-amyl, hexyl, ethyl-hexyl or octyl alcohol are equally suitable for employment for the mercerization as those mixtures of such alcohols. The acid sulphuric esters or their salts may be employed alone or together with organic water-soluble hydroxyl-bearing compounds such as organic solvents as for example ethyl alcohol, ethylene or propylene glycol, or glycerol, mono-ethyl or -butyl ethers of ethyleneglycol, which facilitate dissolution, or 1.3-butylene glycol mono-ethyl ether and the like or phenols, cresols or Turkey red oils.

The sulphuric esters may be prepared in the usual manner, as for example by the treatment of the said aliphatic alcohols, in the presence or absence of solvents or diluents, with sulphonating agents, such as concentrated sulphuric acid or chlorsulphonic acid and the like or by the action of sulphuric acid and the like on aliphatic hydrocarbons which contain a multiple linkage in the molecule. For example the alcohol dissolved in an inert organic solvent may be brought into reaction with the calculated quantity of chlorsulphonic acid, the mixture stirred with water after blowing out the hydrogen chloride formed, and the aqueous acid solution obtained may be employed as such or after neutralization, salting out the product or after evaporation subsequent to separation of the organic solvent.

The following examples will further illustrate the nature of this invention, but the invention is not restricted to these examples.

Example 1

A solution of 5 grams of the neutral sodium salt of the acid sulphuric ester of normal amyl alcohol in 1 litre of caustic soda of 29° Baumé strength constitutes an extremely efficient mercerizing liquor which wets dry cotton yarn very rapidly and shrinks it by about 20 per cent after action for 1 minute.

Example 2

A mercerizing liquor having an activity equally as good as that described in Example 1 is obtained by dissolving in each litre of caustic soda of 29° Baumé strength 5 grams of the acid sulphuric esters of the mixture of alcohols mainly consisting of hexyl and heptyl alcohols and obtainable by a reduction of the mixture of aliphatic ketones prepared from petroleum ether by means of carbon monoxide. With dry cotton yarn the shrinking effect after ½ minute amounts to 19 per cent.

Example 3

5 grams of a mixture of 85 parts by weight of the acid sulphuric ester of normal butyl alcohol and 15 parts by weight of 1.3-butylene glycol monoethyl ether are dissolved in 1 litre of caustic soda of 29° Baumé strength and yield a mercerizing liquor having practically the same properties as that prepared according to Example 1.

Example 4

Caustic soda of 29° Baumé strength each litre of which has been incorporated with 5 grams of a mixture of 85 parts by weight of the acid sulphuric ester of normal hexyl alcohol and 15 parts by weight of 1.3-butylene glycol mono-ethyl ether, effects a shrinking effect of 21 per cent with dry cotton yarn after only 1 minute's action.

Example 5

Dry cotton yarn is treated with a mercerizing liquor consisting of caustic soda solution of 29° Baumé strength to each litre of which 5 grams of a mixture of 80 parts by weight of the acid sulphuric ester of hexyl alcohol and of 20 parts by weight of glycol have been added. After only ½ minute a shrinking effect of 20 per cent is obtained.

Example 6

Dry cotton yarn is treated with a mercerizing liquor consisting of caustic soda solution of 29° Baumé strength to each litre of which 5 grams of a mixture of 70 parts by weight of the acid sulpuhuric esters of amyl alcohol and 30 parts by weight of asym.-m-xylenol have been added. After one minute a shrinking effect of 15.7 per cent is obtained.

*Example 7*

Dry cotton yarn is treated with a mercerizing liquor consisting of caustic soda solution of 29° Baumé strength to each litre of which 5 grams of a mixture of the acid sulphuric ester of hexyl alcohol and 10 parts by weight of Turkey red oil have been added. Already after ½ minute a shrinking effect of 19 per cent is obtained.

What I claim is:—

1. As a new composition of matter, an alkaline mercerizing liquor comprising a water-soluble salt of an acid sulphuric ester of an aliphatic alcohol containing from 4 to 8 carbon atoms.

2. As a new composition of matter, an alkaline mercerizing liquor comprising, per litre, at least 1 gram of a water-soluble salt of an acid sulphuric ester of a monohydric, aliphatic alcohol containing from 4 to 8 carbon atoms.

3. As a new composition of matter, an alkaline mercerizing liquor comprising, per litre, from 1 to 20 grams of a water-soluble salt of an acid sulphuric ester of a monohydric, aliphatic alcohol containing from 4 to 8 carbon atoms.

4. As a new composition of matter, an alkaline mercerizing liquor comprising, per litre, from 1 to 20 grams of a water-soluble salt of an acid sulphuric ester of a monohydric, aliphatic alcohol containing from 4 to 8 carbon atoms, and an organic water-soluble hydroxyl-bearing compound.

5. As a new composition of matter, an alkaline mercerizing liquor comprising, per litre, from 3 to 10 grams of the sodium salt of the acid sulphuric ester of amyl alcohol.

6. As a new composition of matter, an alkaline mercerizing liquor comprising, per litre, from 3 to 10 grams of the sodium salt of the acid sulphuric ester of hexyl alcohol.

HERMANN SCHUETTE.